(12) United States Patent
Okubo (10) Patent No.: US 9,531,946 B2
(45) Date of Patent: Dec. 27, 2016

(54) IMAGE CAPTURING APPARATUS, METHOD OF CONTROLLING THE SAME, AND STORAGE MEDIUM

(71) Applicant: CANON KABUSHIKI KAISHA, Tokyo (JP)

(72) Inventor: Toshiyuki Okubo, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/859,667

(22) Filed: Sep. 21, 2015

(65) Prior Publication Data

US 2016/0094778 A1 Mar. 31, 2016

(30) Foreign Application Priority Data

Sep. 26, 2014 (JP) ................................. 2014-197514

(51) Int. Cl.
*H04N 5/232* (2006.01)
*H04N 5/378* (2011.01)
*H04N 5/369* (2011.01)
*H04N 5/365* (2011.01)
*G02B 7/36* (2006.01)

(52) U.S. Cl.
CPC .......... *H04N 5/23212* (2013.01); *G02B 7/365* (2013.01); *H04N 5/365* (2013.01); *H04N 5/3696* (2013.01); *H04N 5/378* (2013.01)

(58) Field of Classification Search
CPC .. H04N 5/23212; H04N 5/365; H04N 5/3696; H04N 5/378; G02B 7/365
See application file for complete search history.

(56) References Cited

U.S. PATENT DOCUMENTS

| | | | | |
|---|---|---|---|---|
| 9,237,319 | B2* | 1/2016 | Sawadaishi | G02B 7/34 |
| 2010/0238343 | A1* | 9/2010 | Kawarada | H04N 5/23212 348/345 |
| 2011/0109775 | A1* | 5/2011 | Amano | H04N 5/23212 348/241 |
| 2013/0002911 | A1* | 1/2013 | Miyashita | H04N 5/23212 348/247 |
| 2015/0163434 | A1* | 6/2015 | Ishibashi | G02B 7/34 348/66 |
| 2016/0212364 | A1* | 7/2016 | Okazawa | H04N 5/23229 |

FOREIGN PATENT DOCUMENTS

| | | |
|---|---|---|
| JP | 2009-109631 A | 5/2009 |
| JP | 2010-219958 A | 9/2010 |

* cited by examiner

*Primary Examiner* — James Hannett
(74) *Attorney, Agent, or Firm* — Cowan, Liebowitz & Latman, P.C.

(57) ABSTRACT

An image capturing apparatus comprising an image forming pixel and a focus detection pixel arranged on a portion of the image forming pixel, an image sensor that converts a subject image formed by an imaging lens into an image signal, and a control unit that switches between a first mode in which, after the image sensor has been exposed, pixels of the image sensor are sequentially read out in an order in which the pixels are arranged, and a second mode in which a signal from the focus detection pixel and a signal from peripheral pixels are read out first.

9 Claims, 8 Drawing Sheets

FOCUS DETECTION AREA

FIG. 11B

TIMING CHART

IMAGE CAPTURING APPARATUS, METHOD OF CONTROLLING THE SAME, AND STORAGE MEDIUM

BACKGROUND OF THE INVENTION

Field of the Invention

The present invention relates to an image capturing apparatus including a focus detection pixel in an image sensor.

Description of the Related Art

In recent years, image capturing equipment such as household video cameras and digital still cameras have come into common use. They are also equipped with an auto-focus (AF) function that automatically sets the lens focus position, and the user can perform imaging while leaving focusing up to the camera instead of adjusting the focus theirself, making it a function that is beneficial to the user.

AF mechanisms that use an image sensor are largely split into two types according to their structure, namely a contrast AF system and an on-imaging surface phase difference AF system. The contrast AF system performs filter processing on output from normal image forming pixels, and while driving a focus lens, searches for a position with the largest filter output, and obtains the focus position. This system is simply configured, but there is an issue of time being required.

On the other hand, in the on-imaging surface phase difference AF system, focus detection dedicated pixels are provided in the image sensor, a defocus amount is obtained from the difference in output from the pixels dedicated to focus detection, and a focus position is obtained. This system obtains a defocus amount from one image frame, and therefore has the merit of requiring very little time. If the on-imaging surface phase difference AF technique is used, continuous setting of the focus position during continuous shooting is possible without reducing the continuous shooting speed.

For example, in Japanese Patent Laid-Open No. 2009-109631, the focus position is obtained from the focus detection dedicated pixels of an image captured during continuous shooting, and the continuous shooting speed is improved by performing lens driving during readout.

Also, it is disclosed in Japanese Patent Laid-Open No. 2010-219958 that to improve the S/N ratio of the signals from the focus detection pixels, charge storage is performed independently for imaging pixels and focus detection pixels, image data is thinned out and read out, and then signals are read out from the focus detection pixels arranged in the rows that were thinned out.

However, in the method in the above-mentioned Japanese Patent Laid-Open No. 2009-109631, there is an issue of a limit on acceleration of the continuous shooting speed because pixels are read out in succession from the top of the angle of view and therefore a focus position cannot be obtained until readout of the focus detection dedicated pixels has been completed. Also, it is disclosed in Japanese Patent Laid Open No. 2010-219958 that signals from the focus detection pixels are read out together, but no consideration has been given to improving the continuous shooting speed.

SUMMARY OF THE INVENTION

In view of the above-described issues, the present invention realizes further acceleration of continuous shooting speed in an image capturing apparatus that uses an on-imaging surface phase difference AF.

According to the first of the present invention, there is provided an image capturing apparatus comprising: an image sensor that has image forming pixels and focus detection pixels arranged at a portion of the image forming pixels, and is configured to convert a subject image formed by an imaging lens into an image signal; a control unit configured to switch between a first mode in which, after the image sensor has been exposed, pixels of the image sensor are sequentially read out in an order in which the pixels are arranged, and a second mode in which signals from the focus detection pixels and signals from peripheral pixels in a periphery of the focus detection pixels are read out first, and signals from remaining pixels that have not been read out are read out thereafter; and a correction unit configured to correct pixel signals that correspond to positions of the focus detection pixels using the peripheral pixels.

According to the second aspect of the present invention, there is provided a method of controlling an image capturing apparatus comprising an image sensor that has image forming pixels and focus detection pixels arranged at a portion of the image forming pixels and is configured to convert a subject image formed by an imaging lens into an image signal, the method comprising: switching between a first mode in which, after the image sensor has been exposed, pixels of the image sensor are sequentially read out in an order in which the pixels are arranged, and a second mode in which signals from the focus detection pixels and signals from the peripheral pixels in a periphery of the focus detection pixels are read out first, and signals from the remaining pixels that have not been read out are read out thereafter; and correcting pixel signals that correspond to positions of the focus detection pixels using the peripheral pixels.

Further features of the present invention will become apparent from the following description of exemplary embodiments with reference to the attached drawings.

DESCRIPTION OF THE EMBODIMENTS

An embodiment of the present invention is described in detail below with reference to the accompanying drawings.

Figure 1:
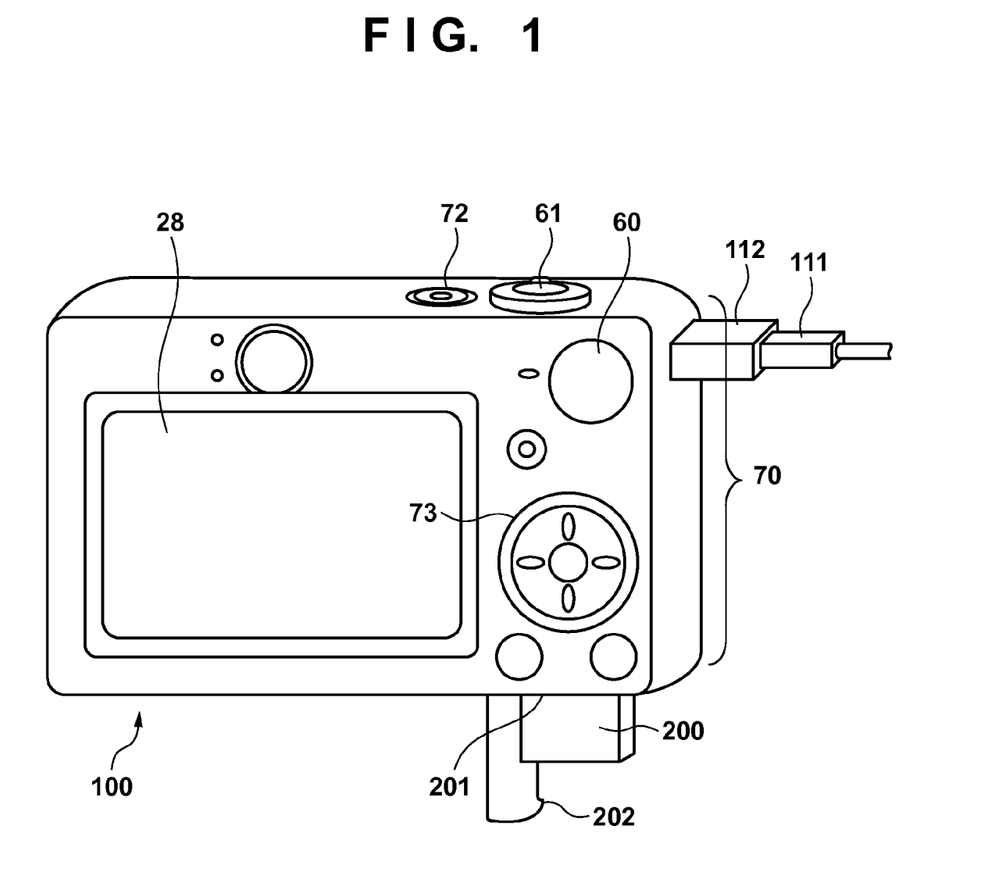
FIG. 1 is an exterior diagram showing an overall image capturing apparatus system according to an embodiment of the present invention.

FIG. 1 is an exterior diagram of a digital camera as an embodiment of an image capturing apparatus of the present invention. In FIG. 1, a display unit 28 is a display unit that displays images and various types of information. A shutter button 61 is an operation unit for performing imaging instructions. A mode switching switch 60 is an operation unit for switching various types of modes. A connector 112 is a connector for a connection cable 111 and a digital camera 100. An operation unit 70 is an operation unit that is made up of operation members that receive various types of operations from the user, such as various types of switches, buttons, and a touch panel. A controller wheel 73 is an operation member included in the operation unit 70 and can be operated by rotation. 72 is a power source switch that switches the power source to ON or the power source to OFF. A recording medium 200 is a recording medium such as a memory card or a hard disk. A recording medium slot 201 is a slot for storing the recording medium 200. The recording medium 200 stored in the recording medium slot 201 can communicate with the digital camera 100. A cover 202 is a cover for the recording medium slot 201.

Figure 2:
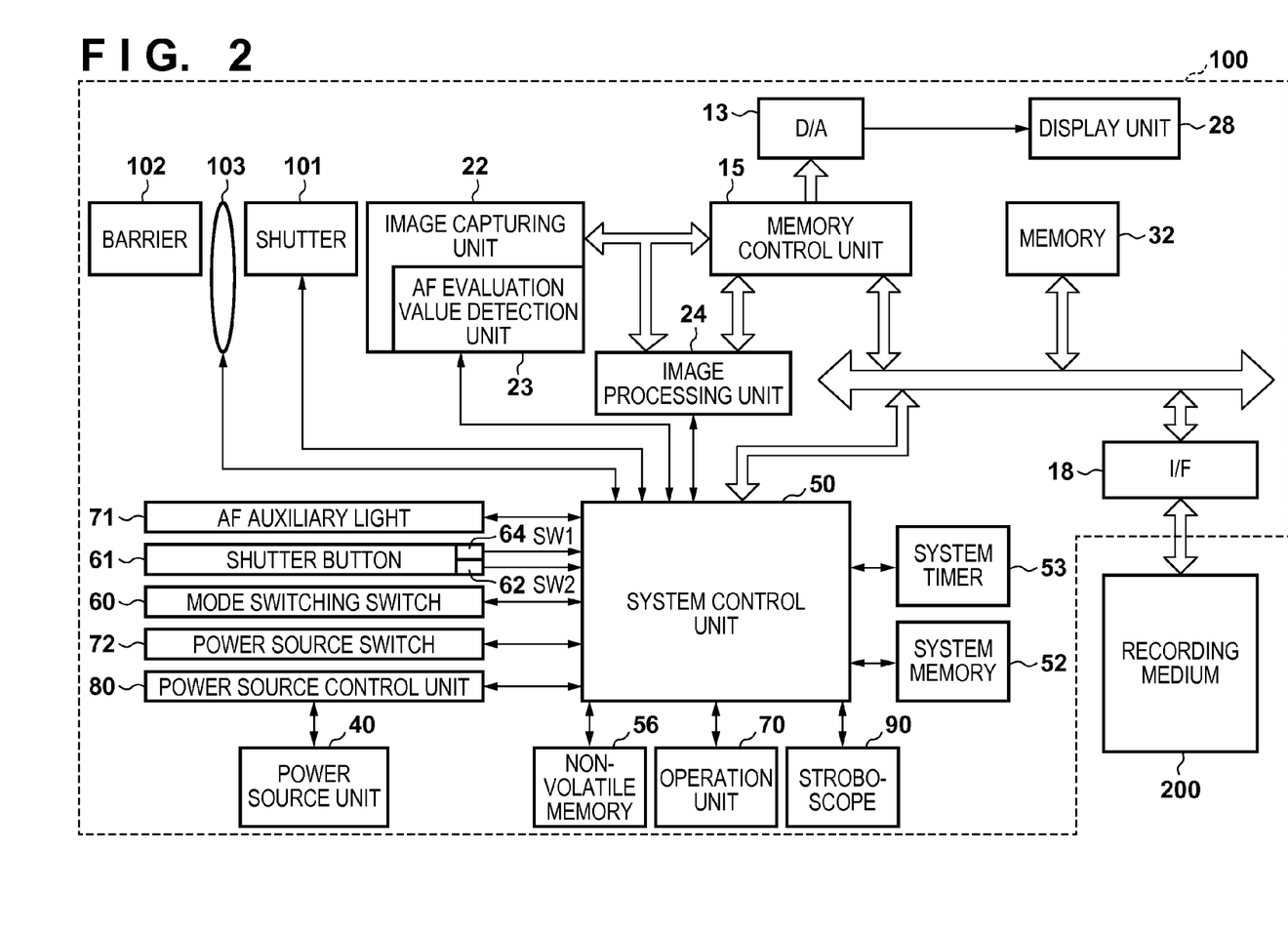
FIG. 2 is a block diagram showing a configuration of the image capturing apparatus according to an embodiment.

FIG. 2 is a block diagram showing a configuration of the digital camera 100 according to the present embodiment. In FIG. 2, an imaging lens 103 that forms a subject image is a group of lenses including a zoom lens and a focus lens. A shutter 101 is a shutter that includes an aperture function. An image capturing unit 22 is an image sensor constituted by a CCD or CMOS sensor or the like that converts an optical image into an electric signal. Also, the image capturing unit 22 includes an A/D conversion processing function. In an AF evaluation value detection unit 23, an AF evaluation value is calculated from contrast information obtained from a digital image signal, focus detection pixel signals, or the like, and the obtained AF evaluation value is output from the image capturing unit 22 to a system control unit 50. A barrier 102 prevents polluting and damaging of the image capturing system that includes the imaging lens 103, the shutter 101, and the image capturing unit 22 by covering the imaging capturing system including the imaging lens 103 of the digital camera 100.

An image processing unit 24 performs predetermined pixel correction, resize processing such as shrinkage, and color conversion processing on data output from the image capturing unit 22 or data from a memory control unit 15. Also, in the image processing unit 24, predetermined arithmetic processing is performed using image data from a captured image, and the system control unit 50 performs exposure control and focus detection control based on the obtained operation result. Accordingly, AE (automatic exposure) processing of the TTL system and EF (automatic modulated light emitting flash) processing are performed. Also, AF (auto-focus) processing is performed in the image processing unit 24, and there are also cases in which, at this time, output from the AF evaluation value detection unit 23 included in the image capturing unit 22 is used. Furthermore, in the image processing unit 24, predetermined arithmetic processing is performed using image data from a captured image, and AWB (auto-white-balance) processing of the TTL system is also performed based on the obtained operation result.

Output data from the image capturing unit 22 is directly written to a memory 32 via the image processing unit 24 and the memory control unit 15 or via the memory control unit 15. The memory 32 stores image data that has been acquired by the image capturing unit 22 and undergone A/D conversion, and stores image data for display on the display unit 28. The memory 32 includes a storage capacity that is sufficient for storing a predetermined number of still images, and a predetermined duration of video and audio.

Also, the memory 32 also serves as a memory for image display (a video memory). A D/A converter 13 converts image display data, which is stored in the memory 32, into an analog signal, and supplies it to the display unit 28. In doing so, display image data written to the memory 32 is displayed by the display unit 28 via the D/A converter 13. The display unit 28 performs display that corresponds to an analog signal from the D/A converter 13 on a display device such as an LCD. Digital signals that have undergone A/D conversion in the image capturing unit 22 and been stored in the memory 32 are successively subjected to analog conversion in the D/D converter 13 and transferred to the display unit 28, thus achieving the function of an electronic viewfinder and making it possible to perform through-the-lens image display.

A non-volatile memory 56 is a memory that can be electrically recorded to and deleted, and can be a flash memory, for example. Operation constants for the system control unit 50, programs, and the like are stored in the non-volatile memory 56. Programs here means programs for executing the later-described various types of flowcharts in the present embodiment.

The system control unit 50 performs overall control of the overall digital camera 100. Processes of the present embodiment, which are described later, are realized by executing the programs recorded in the previously described non-volatile memory 56. 52 is a system memory and can be a RAM. Operation constants and variables for the system control unit 50, programs read out from the non-volatile memory 56, and the like are loaded to the system memory 52. Also, the system control unit 50 also performs display control by controlling the memory 32, the D/A converter 13, the display unit 28, and the like. A system timer 53 is a clock unit for measuring time used for various types of control and for keeping the time of the built-in clock.

The mode switching switch 60, a first shutter switch 62, a second shutter switch 64, and the operation unit 70 are operation units for inputting various types of operation instructions to the system control unit 50. The mode switching switch 60 switches the operation mode of the system control unit 50 to any mode out of a still image recording mode, a moving image recording mode, a playback mode, etc. Modes included as a still imaging recording mode include an automatic imaging mode, an automatic scene determination mode, a manual mode, various types of scene modes having imaging settings for specific imaging scenes, a program AE mode, a custom mode, and the like. A direct switch to any of the modes out of the modes included as a still imaging mode can be performed with the mode switching switch 60. Alternatively, any one of these modes included as a still imaging mode may be switched to using another operation member after once switching to the still imaging mode with the mode switching switch 60. Similarly, multiple modes may also be included as a moving image imaging mode.

During operation of the shutter button 61 provided on the digital camera 100, the first shutter switch 62 is turned ON by a so-called half press (instruction to prepare for imaging), and a first shutter switch signal SW1 is generated. Operations such as AF (auto-focus) processing, AE (automatic exposure) processing, AWB (auto-white balance) processing, EF (automatic modulated light emitting flash) processing, and the like are started by the first shutter switch signal SW1.

After operation of the shutter button 61 has completed, the second shutter switch 64 is turned ON by a so-called full press (an imaging instruction), and a second shutter switch signal SW2 is generated. The system control unit 50 starts, with the second shutter switch signal SW2, a series of imaging processing operations from readout of a signal from the image capturing unit 22 to writing image data to the recording medium 200.

The operation members of the operation unit 70 operate as various types of function buttons which have been allocated a function suitable for the situation by performing operations to select various types of function icons displayed on the display unit 28. An end button, a back button, an image advance button, a jump button, a refine button, a change attributes button, and the like are examples of a function button. For example, if a menu button is pressed, a menu screen that allows various settings to be made is displayed on the display unit 28. The user can intuitively perform various types of settings using the menu screen displayed on the display unit 28, a four direction button i.e., up, down, left, and right, and a SET button.

AF auxiliary light 71 is emitted at times of low luminance to illuminate the subject. The control wheel 73 is an operation member that can be operated by rotation and is included in the operation unit 70, and is used along with the direction button when designating an item for selection, and the like. When the controller wheel 73 is operated by rotation, an electrical pulse signal is generated according to the operation amount, and the system control unit 50 controls the units of the digital camera 100 based on this pulse signal. Using this pulse signal, the angle to which the controller wheel 73 was operated by rotation, how many times it was rotated, and the like can be determined. Note that the controller wheel 73 may take any form as long as it is an operation member that can detect operation by rotation. For example, the controller wheel 73 may be a dial operation member in which, according to rotational operation by the user, the controller wheel 73 itself is rotated and a pulse signal is generated. Also, it may be an operation member made up of a touch sensor in which rotational operations by the user on the controller wheel 73 and the like are detected, without the controller wheel 73 itself being rotated (a so-called touch wheel).

A power source control unit 80 is configured by a battery detection circuit, a DC-DC converter, a switch circuit that switches blocks that are energized, and the like, and performs the detection of the presence or absence of a mounted battery, the type of battery, and the remaining charge of the battery. Also, the power source control unit 80 controls the DC-DC converter and supplies the required voltage for the required period to units including the recording medium 200 based on the detection results and instructions from the system control unit 50.

A power source unit 40 is made up of a primary battery such as an alkaline battery or a lithium battery; a secondary battery such as a NiCd battery, a NiMH battery, or a Li-ion battery; an AC adapter, or the like. A recording medium I/F 18 is an interface with the recording medium 200 which may be a memory card or a hard disk. The recording medium 200 is a recording medium such as a memory card for recording captured images, and is constituted by a semi-conductor memory, a magnetic disk, or the like.

Figure 3:
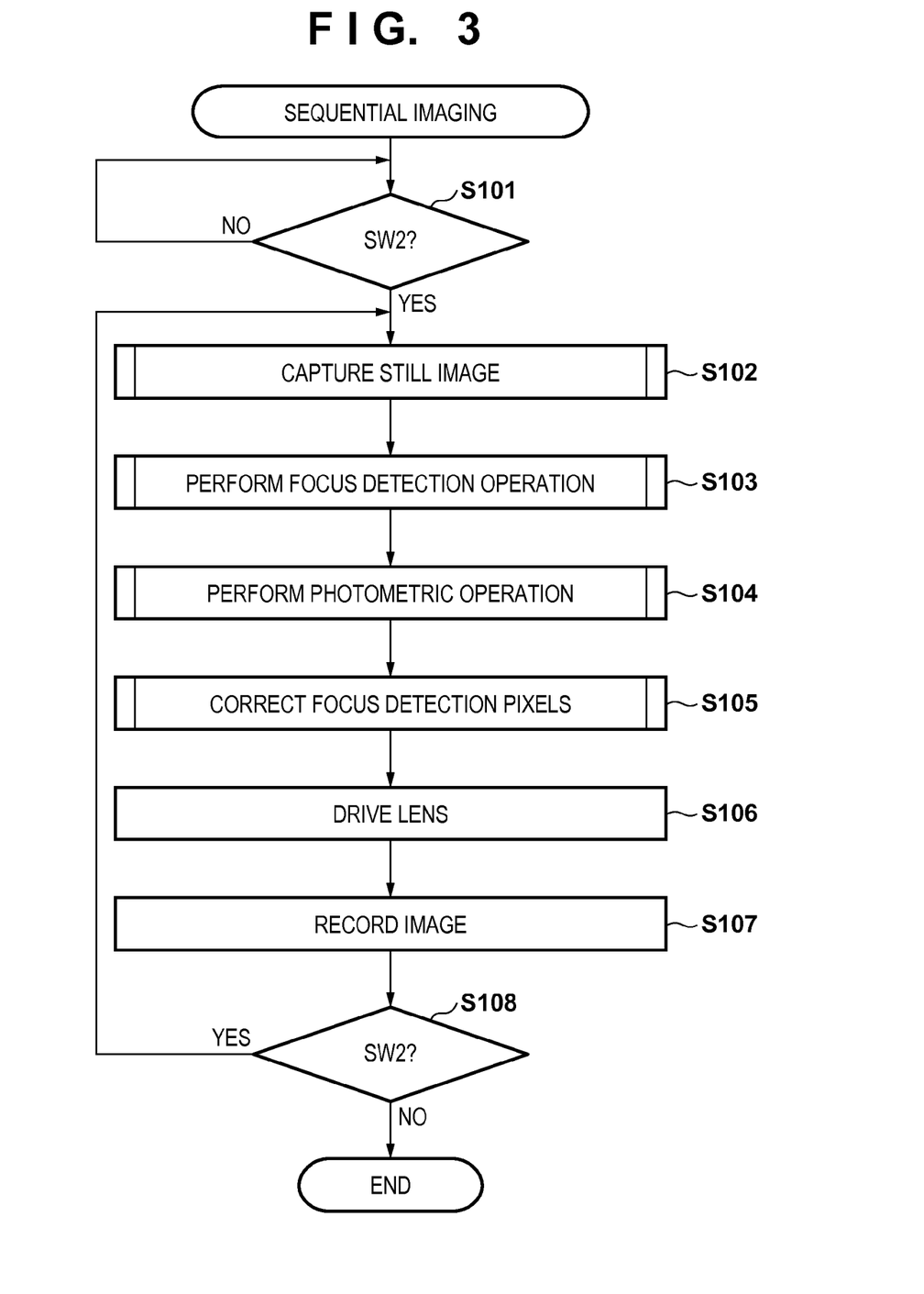
FIG. 3 is a flowchart showing a sequential shooting sequence according to an embodiment.

FIG. 3 is a flowchart showing a sequential shooting sequence in the present embodiment. Continuous shooting starts if the second shutter switch 64 is pressed in the sequential shooting mode (step S101). In step S102, still image exposure and readout are performed, a focus detection operation is performed based on the image read out in step S102 (step S103) to obtain the focus position for the next instance of imaging, and photometric operations are performed (step S104) to determine the light exposure for the next instance of imaging. In step S105, correction processing is performed because the pixels read out as focus detection pixels cannot be used as is as an image.

Step S103 of performing focus detection operations, step S104 of performing photometric operations, and step S105 of performing focus detection pixel correction will be described later in detail. In step S106, the imaging lens 103 is driven to the focus position that was obtained in step S103, the aperture is driven so as to achieve the exposure determined in step S104, and the image captured in step S107 is recorded to the recording medium 200.

Figure 4:
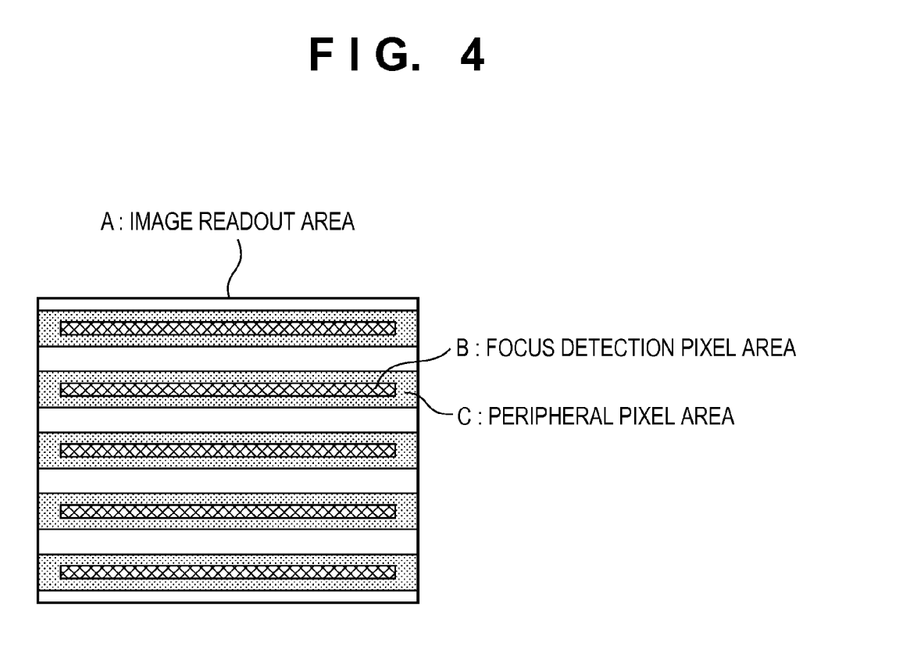
FIG. 4 is a diagram showing an image readout area according to an embodiment.

FIG. 4 is a diagram showing an image readout area according to the present embodiment. A indicates the overall image readout area. In contrast, areas B, which are focus detection pixel areas, are arranged discretely in a screen of arranged image forming pixels, and when the focus detection pixel area B is read out, the peripheral pixel area, which is indicated by C and includes pixels that are adjacent to the focus detection pixel area is simultaneously read out. The reason that the focus detection pixel area B is not read out alone but rather read out including the peripheral pixel area C is that the peripheral pixel area C is used to perform photometric operations before full image readout, and that peripheral pixel area information needs to be used in order to correct the focus detection pixel area B so as to correspond to normal pixels.

Figure 5:
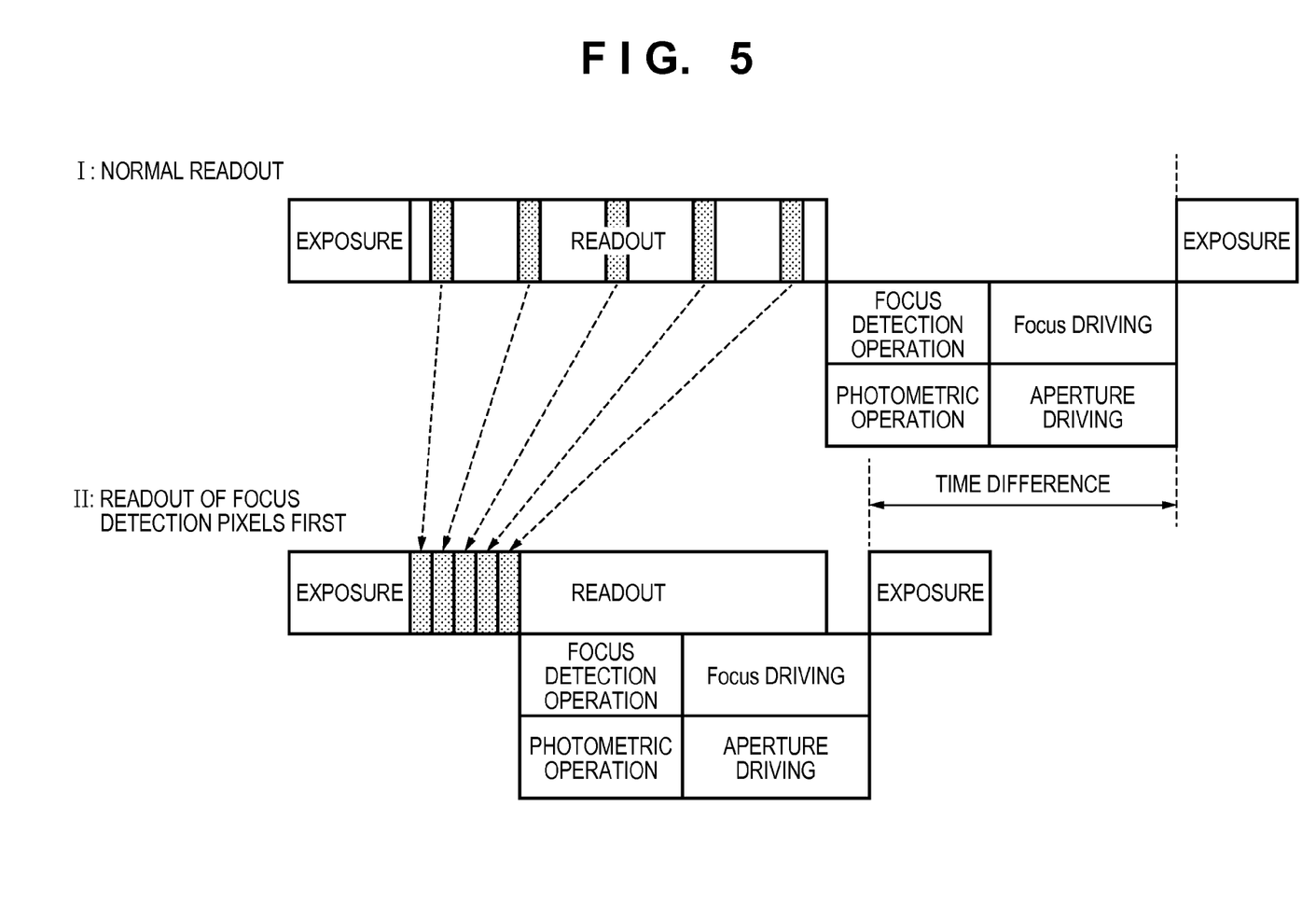
FIG. 5 is a diagram showing a timing chart for pixel readout orders according to an embodiment.

FIG. 5 is a diagram showing a timing chart for pixel readout orders in the present embodiment. The normal readout of I is the conventional order for a readout of focus detection pixels. After the operation of exposing the image sensor 22 has been completed, the shutter 101 is shielded, and readout operations are performed. Readout is performed in order from the top of the screen, and the focus detection pixels arranged discretely mid-way are read out. Once all of the focus detection pixels have been read out, the focus detection operation starts, and the imaging lens 103 is driven based on the focus detection result. Photometric operations are performed in parallel with this operation, and the aperture is driven based on the result of the photometric operation. Once preparation for the next instance of imaging preparation has been completed, the next instance of exposure starts.

In this way, not being able to start a focus detection operation until all the readout of all pixels dedicated to focus detection has been completed impedes acceleration of the continuous shooting speed.

II in the present embodiment is a readout order that allows the continuous shooting speed to be accelerated by prefetching the focus detection pixel areas. After the operation for exposing the image sensor 22 has been completed, the shutter 101 is shielded, and the readout operation is performed, but the focus detection pixel areas and the peripheral pixel areas are read out first rather than starting from the top of the screen, and thereafter the remaining pixels are read out. Once the focus detection pixel areas and the peripheral pixel areas have been read out, the focus detection operation and the photometric operations start. By driving the imaging lens 103 and the aperture after the operations have been completed the time until the next imaging can be reduced to a time that is shorter than that of the conventional readout system. Note that in the image capturing apparatus of the present embodiment, the mode indicated by I and the mode indicated by II mentioned above are switched as needed.

Figure 6:
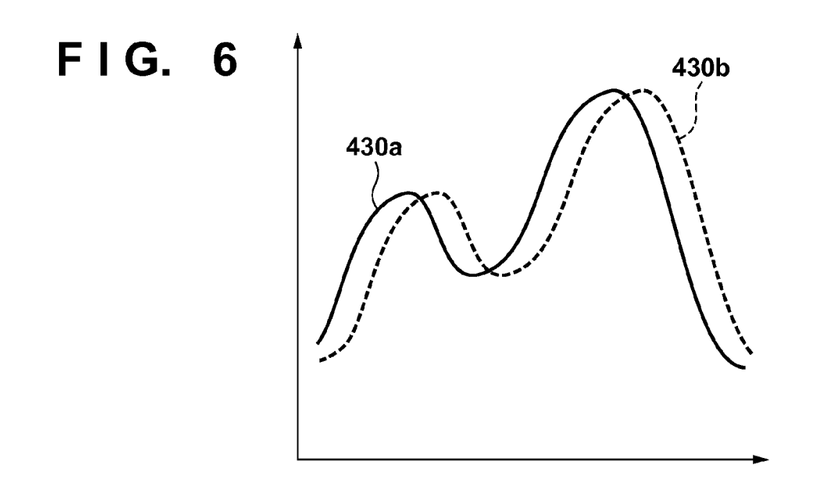
FIG. 6 is a diagram regarding operations in on-imaging surface phase difference AF according to an embodiment.

FIG. 6 is a diagram showing an on-imaging surface phase difference AF operation in the present embodiment. In FIG. 6 shows a pair of focus detection signals transmitted to the AF evaluation value detection unit (an on-imaging surface phase difference focus detection unit) 23 after photoelectric conversion is performed by the image capturing unit (image sensor) 22 and various types of correction are performed by an image processing circuit 24. In FIG. 6, the horizontal axis indicates the pixel alignment direction of the concatenated signals, and the vertical axis indicates the signal strength. A focus detection signal 430a and a focus detection signal 430b are signals respectively formed by focus detection pixels SHA and focus detection pixels SHB. Also, the imaging lens 103 is in a defocused state with respect to the image capturing unit 22, and therefore the focus detection signal 430a is in a state shifted to the left side, and the focus detection signal 430b is in a state shifted to the right side. By calculating the shift amount of the focus detection signals 430a and 430b using a well-known correlation operation or the like in the AF evaluation value detection unit 23, it is possible to know how much the imaging lens 103 is defocused. The system control unit 50 calculates a focus lens drive amount based on the lens position information of the imaging lens 103 and the defocus amount obtained from the AF evaluation value detection unit 23. Thereafter, the system control unit 50 transmits position information to which the imaging lens 103 is to be driven, based on the focus lens position information. Accordingly, it is possible to perform focusing with the imaging lens 103.

Figure 7:
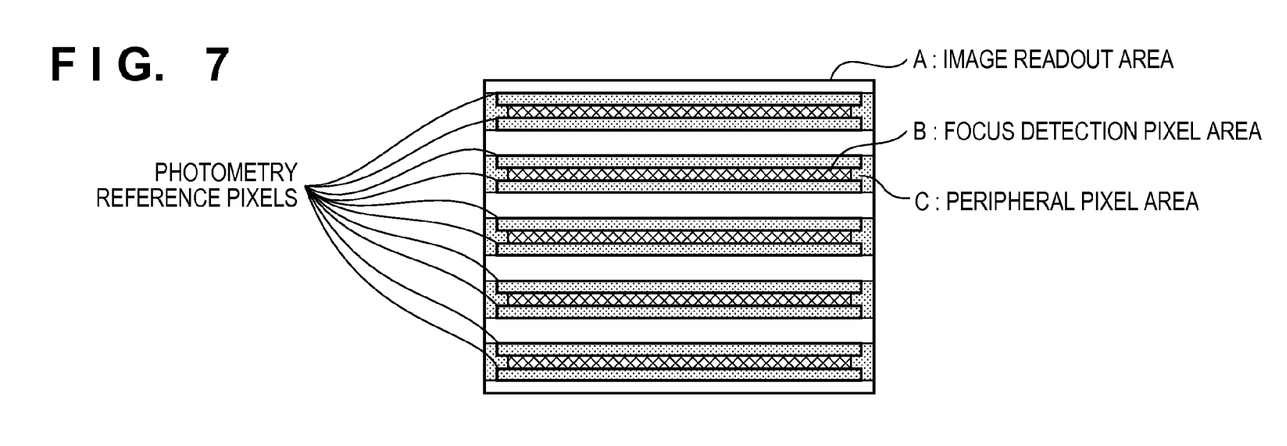
FIG. 7 is a diagram regarding a photometric operation according to an embodiment.

FIG. 7 is a diagram regarding a photometric operation in the present embodiment. The peripheral pixels that are read out at the same time as the focus detection pixels have the same characteristics as normal pixels, and therefore their output can be used for photometric operations. The image capturing unit 22 performs photoelectric conversion, various types of processing are performed with the image processing circuit 24, and thereafter a photometric evaluation value is calculated.

Photometric reference pixel areas in FIG. 7 are divided into blocks, integration processing is performed in the image processing circuit 24, and a photometric value is determined so that the integration result is at a suitable level.

Letting the exposure value when a still image is captured be BvPrev, letting the exposure value for the next instance of imaging be BvNext, letting the photometric evaluation value of the photometric reference pixel areas be Ycapt, and letting the target value of the photometric evaluation value be Yref, BvNext is obtained by the following expression.

$$BvNext=BvPrev+\log_2(Ycapt/Yref)$$

After BvNext is obtained, setting values are determined for shutter speed, aperture, ISO sensitivity, and the like based on a program line diagram or the like, and aperture control is performed on the imaging lens 103.

Figure 8:
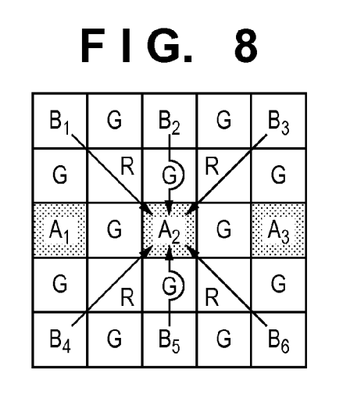
FIG. 8 is a diagram regarding focus detection pixel correction according to an embodiment.

FIG. 8 is a diagram regarding correction of the focus detection pixels in the present embodiment. An example of focus detection pixels A arranged at B pixel (blue pixel) positions is described in the present embodiment. The focus detection pixels A are arranged at B pixel positions, and therefore correction is performed on pixel signals from the B pixels (blue pixels). The B pixels are pixels B1 to B6 in the vertical direction, and first the correction direction is determined.

The three combinations that can be used for correction are B1 and B6, B2 and B5, and B3 and B4. First, the combination with the smallest difference out of the three combinations is found.

$$Diff\_B1\_B6=|B1-B6|$$

$$Diff\_B2\_B5=|B2-B5|$$

$$Diff\_B3\_B4=|B3-B4|$$

For example, in the case in which the combination B2/B5 has the smallest difference, correction is performed using the two pixels B2 and B5. The pixel value of a correction target pixel A2 is the average value of B2 and B5.

$$A2=(B2+B5)/2$$

In this case, the combination with the smallest difference was used, but in the case in which the smallest difference is larger than or equal to a predetermined value, the reliability is low, and thus the average value of all of the pixels B1 to B6 may be used as the correction value.

Figure 9:
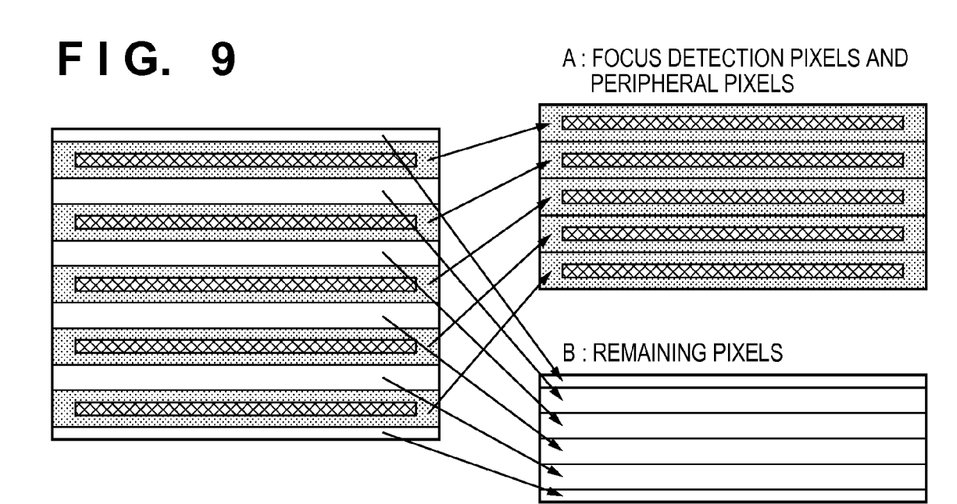
FIG. 9 is a diagram regarding fixed-pattern noise correction according to an embodiment.

FIG. 9 is a diagram regarding fixed-pattern noise correction in the present embodiment. Fixed-pattern noise called dark shading occurs on the image sensor 22 due to exposure conditions and environment conditions such as temperature at the time of imaging. To correct dark shading, the image sensor 22 is shielded by the shutter 101 and a black image is captured under the same exposure conditions as those at the time of imaging, and a random noise component is suppressed by performing filter processing.

When performing filter processing, the focus detection pixels and the peripheral pixel areas are combined as indicated by A in FIG. 9, and filter processing is performed. Also, the remaining pixel areas are also combined as indicated by B in FIG. 9, and filter processing is performed. After the areas have undergone individual filter processing, they are returned to their positions in the image, a post-filtering combined image is subtracted from the original image, and thus dark shading correction is complete.

The reason areas are divided when filtering is performed is because the occurrence of dark shading is different between areas with different readout orders, and therefore there is a need to perform filter processing on pixels that were read out close to each other in the time series.

Figure 10:
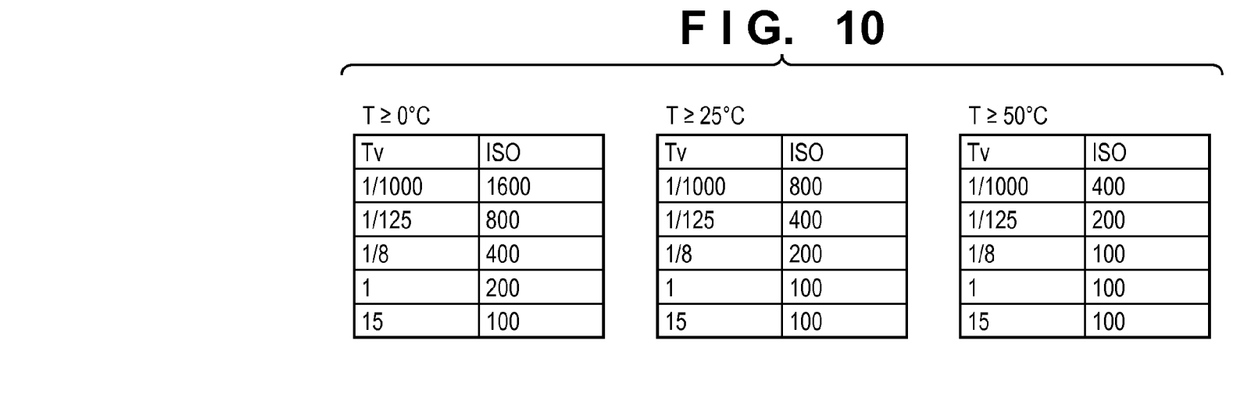
FIG. 10 is a diagram showing conditions for switching between focus detection pixel pre-fetching and normal readout according to an embodiment.

FIG. 10 is a diagram showing conditions for switching between focus detection pixel pre-fetching and normal readout in the present embodiment. Fixed-pattern noise occurs on the image sensor 22 due to exposure conditions and environment conditions such as temperature, but the amount of fixed-pattern noise increases under harsh conditions such as long shutter speeds, high ISO sensitivity, and high temperatures. For this reason, there are cases in which noise cannot be fully removed even if the focus detection pixels are read out first and fixed-pattern noise is corrected, and there is a need to stop pre-fetching of the focus detection pixels and switch to normal readout according to the exposure condition and the temperature condition.

FIG. 10 shows conditions in which focus detection pixel pre-fetching is permitted according to shutter speed Tv and ISO sensitivity for respective temperature conditions.

When a temperature T is at 0° C. or higher, focus detection pixel pre-fetching is permitted if the shutter speed is faster than 1/1000 (seconds) and the ISO sensitivity is 1600 or lower. Similarly, when the temperature T is at 25° C. or higher, focus detection pixel pre-fetching is permitted if the shutter speed is faster than 1/1000 (seconds) and the ISO sensitivity is 800 or lower.

By performing this determination each time imaging is performed, the continuous shooting speed can be improved within a scope in which image quality is not influenced, even if pre-fetching of focus detection pixels is performed.

Figure 11A:
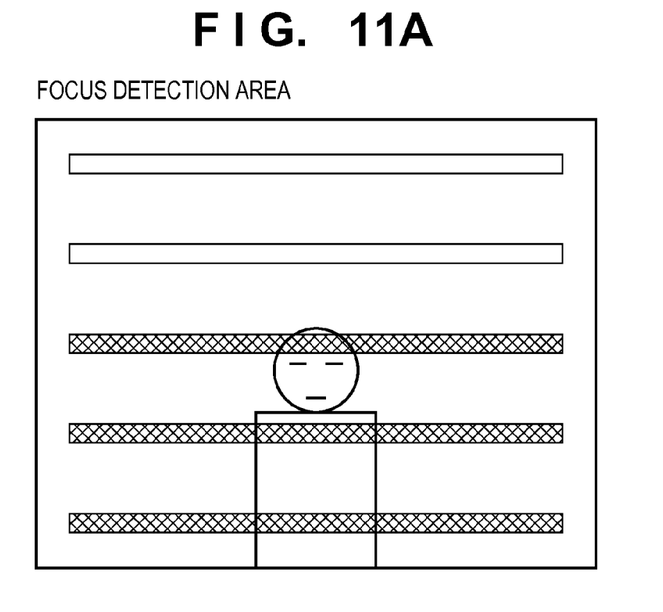
FIGS. 11A and 11B are diagrams showing a change in a focus detection pixel pre-fetching area according to an embodiment.
Figure 11B:
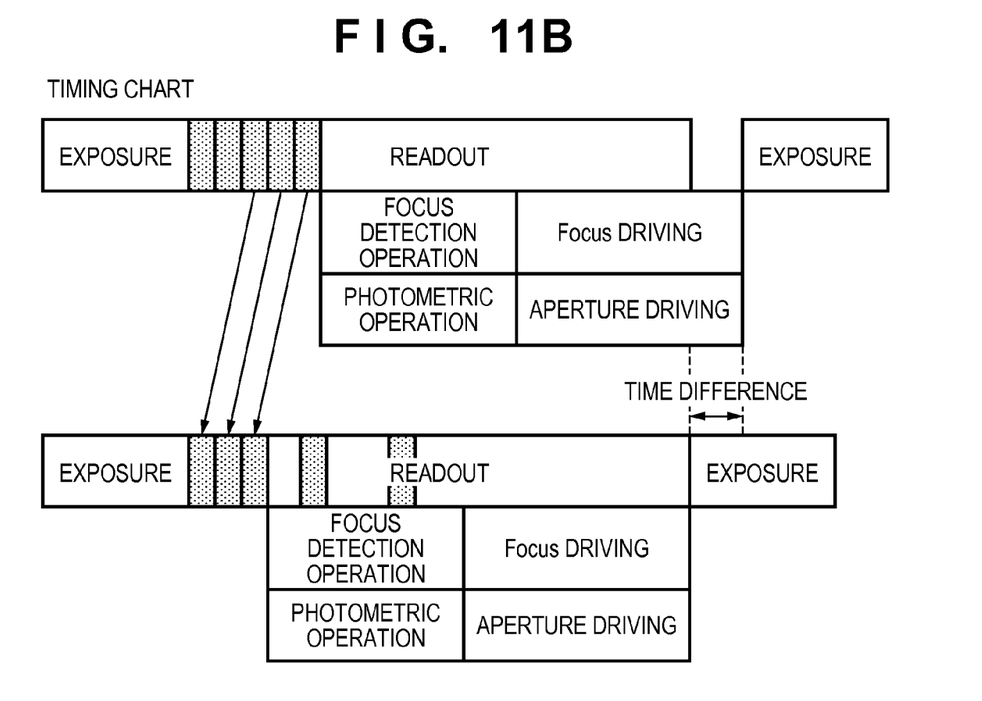

FIGS. 11A and 11B are diagrams showing changes to the focus detection pixel pre-fetching area in the present embodiment. FIG. 11A shows an example in which the subject in the imaging screen is touching the bottom three lines of focus detection pixels out of the five lines of focus detection pixels. Out of the five focus detection pixel lines, the top two lines are not used for focus detection, and therefore there is no need to target them for focus detection pixel pre-fetching.

The upper portion of the timing chart in FIG. 11B is the timing in the case in which all of the focus detection pixels are pre-fetched, and the lower portion is the timing in the case in which only the bottom three lines of focus detection pixels are pre-fetched. Since there is no need to read out the upper two lines, pre-fetching can be completed even earlier, and the continuous shooting speed can be improved by performing the focus detection operation and the driving of the lens in parallel.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-197514, filed Sep. 26, 2014, which is hereby incorporated by reference herein in its entirety.

What is claimed is:

1. An image capturing apparatus comprising:
   an image sensor that has image forming pixels and focus detection pixels arranged at a portion of the image forming pixels, and is configured to convert a subject image formed by an imaging lens into an image signal;
   a control unit configured to switch between a first mode in which, after the image sensor has been exposed, pixels of the image sensor are sequentially read out in an order in which the pixels are arranged, and a second mode in which signals from the focus detection pixels and signals from peripheral pixels in a periphery of the focus detection pixels are read out first, and signals from remaining pixels that have not been read out are read out thereafter; and
   a correction unit configured to correct pixel signals that correspond to positions of the focus detection pixels using the peripheral pixels.

2. The image capturing apparatus according to claim 1, wherein the control unit performs control such that after readout of the focus detection pixels and the peripheral pixels, a focus detection operation and driving of the imaging lens are performed in parallel while the remaining pixels that have not been read out are read out.

3. The image capturing apparatus according to claim 1, wherein the control unit performs control such that after readout of the focus detection pixels and the peripheral pixels, a photometric operation and driving of an aperture of the imaging lens are performed in parallel while the remaining pixels that have not been read out are read out.

4. The image capturing apparatus according to claim 1, wherein the control unit switches between the first mode and the second mode based on at least one out of shutter speed, sensitivity, and temperature at the time of imaging.

5. The image capturing apparatus according to claim 1, wherein the control unit switches a method of correcting fixed-pattern noise of the image sensor according to whether the first mode is used or the second mode is used.

6. The image capturing apparatus according to claim 5, wherein in a case in which the second mode is used, the control unit performs filter processing separately for the focus detection pixels and the peripheral pixels, and for the remaining pixels.

7. The image capturing apparatus according to claim 1, wherein the control unit changes an area in which the focus detection pixels are to be read out first in the second mode, based on a position of a subject in a screen of the image sensor.

8. A method of controlling an image capturing apparatus comprising an image sensor that has image forming pixels and focus detection pixels arranged at a portion of the image forming pixels and is configured to convert a subject image formed by an imaging lens into an image signal, the method comprising:
   switching between a first mode in which, after the image sensor has been exposed, pixels of the image sensor are sequentially read out in an order in which the pixels are arranged, and a second mode in which signals from the focus detection pixels and signals from the peripheral pixels in a periphery of the focus detection pixels are read out first, and signals from the remaining pixels that have not been read out are read out thereafter; and
   correcting pixel signals that correspond to positions of the focus detection pixels using the peripheral pixels.

9. A non-transitory computer-readable storage medium storing a computer-executable program for causing a computer to execute a method of controlling an image capturing apparatus comprising an image sensor that has image forming pixels and focus detection pixels arranged at a portion of the image forming pixels and is configured to convert a subject image formed by an imaging lens into an image signal, the method comprising:

switching between a first mode in which, after the image sensor has been exposed, pixels of the image sensor are sequentially read out in an order in which the pixels are arranged, and a second mode in which signals from the focus detection pixels and signals from the peripheral pixels in a periphery of the focus detection pixels are read out first, and signals from the remaining pixels that have not been read out are read out thereafter; and
correcting pixel signals that correspond to positions of the focus detection pixels using the peripheral pixels.

* * * * *